United States Patent
Nahas

(10) Patent No.: US 7,740,205 B1
(45) Date of Patent: Jun. 22, 2010

(54) AUXILIARY WING AND FLAP ASSEMBLY FOR AN AIRCRAFT

(76) Inventor: Roger A. Nahas, 19326 Brooktrail La., Huntington Beach, CA (US) 92648

( * ) Notice: Subject to any disclaimer, the term of this patent is extended or adjusted under 35 U.S.C. 154(b) by 168 days.

(21) Appl. No.: 11/448,271

(22) Filed: Jun. 6, 2006

(51) Int. Cl.
*B64C 3/00* (2006.01)

(52) U.S. Cl. .................. 244/198; 244/213; 244/215; 244/45 R; 244/99.12

(58) Field of Classification Search .............. 244/198, 244/199.3, 213, 215, 45 R, 46, 49, 13, 99.12
See application file for complete search history.

(56) References Cited

U.S. PATENT DOCUMENTS

| | | | | |
|---|---|---|---|---|
| 1,841,804 A * | 1/1932 | Hall | ............... | 244/212 |
| 3,831,885 A * | 8/1974 | Kasper | ............... | 244/199.1 |
| 4,182,503 A * | 1/1980 | Muscatell | ............... | 244/219 |
| 4,717,097 A * | 1/1988 | Sepstrup | ............... | 244/217 |
| 4,881,703 A * | 11/1989 | Nahas | ............... | 244/213 |
| 6,554,229 B1 * | 4/2003 | Lam et al. | ............... | 244/217 |
| 6,863,245 B2 * | 3/2005 | Gessler et al. | ............... | 244/215 |

* cited by examiner

*Primary Examiner*—J. Woodrow Eldred
(74) *Attorney, Agent, or Firm*—Denton L. Anderson; Sheldon Mak Rose & Anderson

(57) ABSTRACT

An auxiliary wing and flap assembly for an aircraft which is to be extendable from a retracted position to a deployed position. Relative to the chord of the wing, the split flap is located directly adjacent the trailing edge of the wing with the auxiliary wing assembly being located at approximately the mid length of the chord of the wing. A split flap assembly extends approximately one-half the length of the aircraft wing with the auxiliary wing assembly extending the total length of the aircraft wing. The split flap is extendable to assume approximately a sixty degree angle relative to the bottom surface of the aircraft wing while the auxiliary wing assembly is extendible to assume a maximum of ninety degree angle relative to the bottom surface of the aircraft wing. The chord length of the split flap is equal to approximately 0.15 of the chord length of the aircraft wing while the auxiliary wing assembly has an airfoil-shaped member that has a chord length of approximately 0.25 the chord length of the aircraft wing.

5 Claims, 1 Drawing Sheet

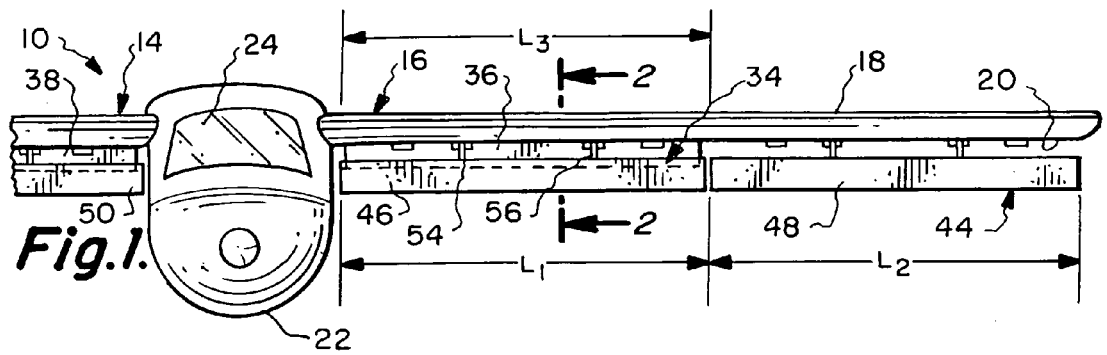
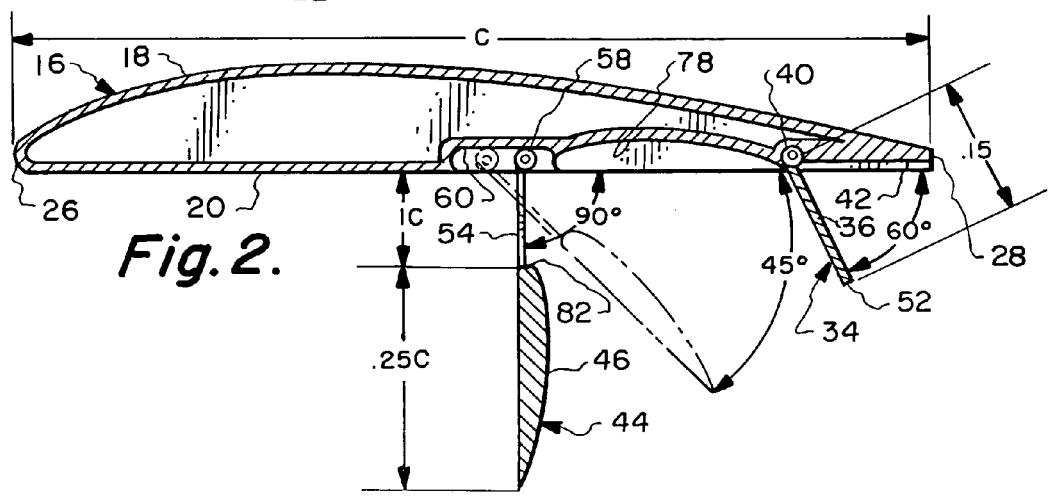
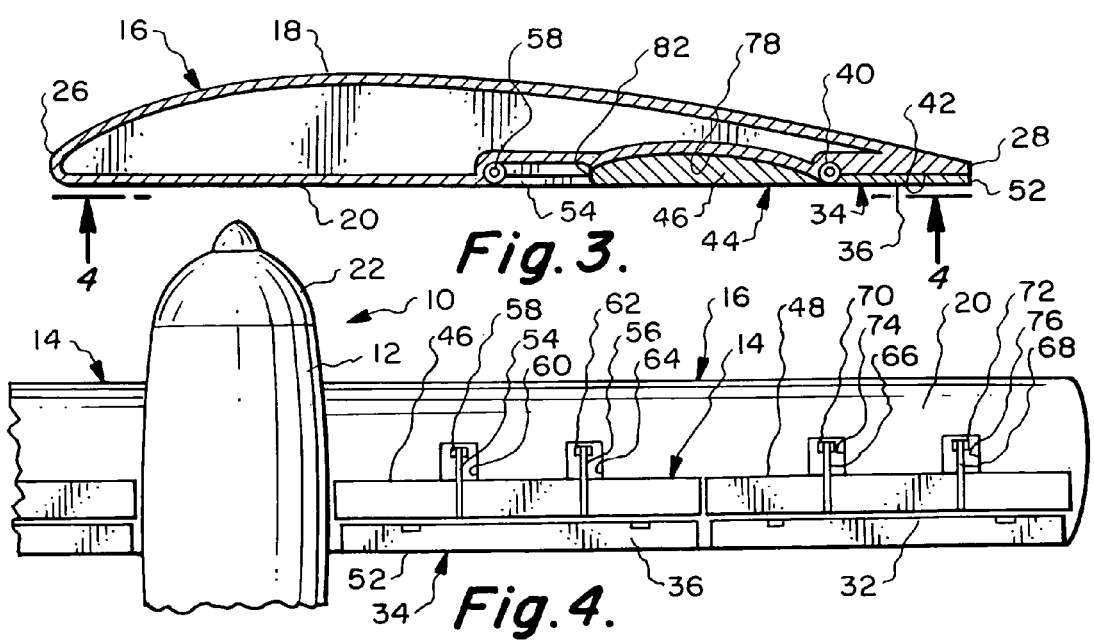

AUXILIARY WING AND FLAP ASSEMBLY FOR AN AIRCRAFT

BACKGROUND OF THE INVENTION

1. Field of the Invention

This invention relates to aircraft and more particularly to a new and novel auxiliary wing and flap assembly which permits the aircraft to land and take off in a substantially shorter distance while maintaining a high cruising speed.

2. Description of the Related Art

The use of a split flap in aircraft is exceedingly conventional. It is common that the split flaps are to be located at the trailing edge of the wing of the aircraft. The primary purpose of the split flap is to increase lift and also decrease the speed of the aircraft. Generally, these split flaps are used during landing of the aircraft.

The present invention is to be discussed primarily in conjunction with small aircraft. The present invention is of particular advantage in conjunction with small aircraft. However, it is considered to be within the scope of this invention that the present invention could be utilized in conjunction with larger aircraft and even commercial aircraft.

Small aircraft that have only a single engine have a disadvantage when compared to multi-engine aircraft. If the single engine becomes inoperative during flight, obtaining quickly adequate landing space is, at times, difficult and many times almost impossible. Also, the aircraft may be coming down to the ground at too steep of an angle to perform any kind of a "soft landing". It is for this reason that many times operators of small aircraft are killed or severely injured upon an engine problem occurring with the aircraft during flight.

Some airports are located very near congested areas. It is typical that the landing angle to be in the range of four to six degrees for most aircraft. This means that in a congested area where the airport is surrounded with buildings and houses that utilizing of a shallow angle of four to six degrees constitutes a rather dangerous situation. It would be safer if the aircraft could come in at a much steeper angle, such as between twenty and thirty degrees which would result in the aircraft avoiding the congested area located around the airport.

Also, when the aircraft is taking off in a congested location, it is desirable for the aircraft to get in the air as soon as possible and climb to a safe altitude to avoid congestion located directly adjacent the airport and to decrease noise pollution which is a frequent complaint around airports. Prior to the present invention, most aircraft have to take off and climb at a rather shallow angle and also require a significant runway length in order to get the airplane into the air. Utilizing of an extended runway length is again a potentially dangerous situation.

It would be desirable to construct an auxiliary wing and flap assembly to be deployable in conjunction with small aircraft that would permit the small aircraft to take off in a substantially shorter runway length and land also in a substantially shorter runway length. Also, it would be desirable to have the landing angle of the aircraft to be between twenty and thirty degrees which is substantially greater than the normal four to six degrees of most aircraft.

SUMMARY OF THE INVENTION

The basic embodiment of the present invention is directed to an auxiliary wing and flap assembly for an aircraft which utilizes a split flap mounted on a first hinge axis on the aircraft wing with the split flap being located directly adjacent the trailing edge of the wing. The split flap is to be movable between a first retracted position and an extended position with the first retracted position locating the split flap against the aircraft wing and the extended position locating the split flap substantially transverse to the aircraft wing. An auxiliary wing assembly is mounted by a hinge connection to the aircraft wing with this hinge connection being located intermediate the leading edge and the first hinge axis. The auxiliary wing defines an airfoil-shaped member mounted by a bracket assembly to the aircraft wing with the auxiliary wing assembly being movable between a second retracted position and a deployed position. The second retracted position locates the airfoil shaped-member against the aircraft wing. The deployed position locates the airfoil-shaped member transversely to the aircraft wing. When in the deployed position there is created a longitudinal air gap area located between the airfoil-shaped member and the aircraft wing. The split flap, when located in the extended position, and the auxiliary wing, when located in the deployed position will cause the aircraft when flying to appreciably slow and lift in order to substantially shorten the landing distance when landing of the aircraft and also function to substantially increase lift when taking off of the aircraft.

A further embodiment of the present invention is where the basic embodiment is modified by defining that the chord length of the wing is defined as C with the chord length of the flap being defined as 0.15 C, the chord length of the airfoil-shaped member of the auxiliary wing assembly being 0.25 C and the width air gap area located between the airfoil-shaped member and the aircraft wing being defined as 0.1 C in the fully deployed position.

A further embodiment of the present invention is where the basic embodiment is modified by defining that the split flap is defined as being elongated and planar with the length of the flap to be approximately equal to one-half the overall length of the wing.

A further embodiment of the present invention is where the basic embodiment is modified by defining that the split flap is to be locatable when in the extended position at a sixty degree angle relative to the chord axis of the aircraft wing.

A further embodiment of the present invention is where the basic embodiment is modified by defining that the auxiliary wing assembly is actually divided into two sections on each aircraft wing with each section being of substantially equal length.

A further embodiment of the present invention is where the basic embodiment is modified by defining that the hinged connection permits lineal movement of the auxiliary wing assembly in a direction parallel to the chord axis of the wing during movement of the auxiliary wing assembly to its deployed position.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is a front elevational view of a left wing of a small light aircraft within which has been incorporated the auxiliary wing and flap assembly of the present invention;

FIG. 2 is a cross-sectional view through the aircraft wing of FIG. 1 taken along line 2-2 of FIG. 1 showing the auxiliary wing and flap assembly in the fully deployed position;

FIG. 3 is a cross-sectional view similar to FIG. 2 but showing the auxiliary wing and flap assembly in the stowage position which would be the position when the aircraft is flying normally; and FIG. 4 is a bottom plan elevational view of the aircraft wing showing the auxiliary wing and flap assembly in the stowage position taken along line 4-4 of FIG. 3.

DETAILED DESCRIPTION OF THE INVENTION

Referring particularly to the drawing, there is shown an aircraft 10 that has a fuselage 12, a right wing 14 and a left wing 16. The structure of the present invention is going to be discussed in relation to the left wing 16. However, it is considered to be within the scope of this invention that the same structure will be employed in conjunction with the right wing 14. Mounted on the lower end of the fuselage is a conventional landing gear of some sort, which is not shown.

The wing 16 is airfoil-shaped and has a top surface 18 and a bottom surface 20. The front of the fuselage 12 is formed into a nose 22 and above the nose 22 is located a windshield 24. The aircraft wing 16 has a leading edge 26 and a trailing edge 28. It is to be understood that when the aircraft 10 is flown that the leading edge 26 is first to move through the air. The aircraft wing 16 has a chord length which is shown as C in FIG. 2. The aircraft wing 16 has a chord axis which extends between the tip of the leading edge 26 and the trailing edge 28.

The outboard area of the aircraft wing 16 includes an aileron 32. This aileron 32 is deemed to be conventional in conjunction with aircraft with both the outboard area of both wings 14 and 16 having such an aileron. The length of the aileron 32 is deemed to be matter of option but, as shown in the drawing, it has a length $L_2$. The inboard portion of the aircraft wing 16 includes a split flap assembly 34. The length of the split flap assembly 34 is shown to be $L_3$ and generally $L_3$ is approximately equal to $L_2$. However, it is not mandatory that these two lengths be equal. The split flap assembly 34 includes an elongated planar split flap member 36 with there being a similar split flap member 38 associated with the aircraft wing 14. The split flap member 36 is hingedly mounted by hinge 40 within the bottom surface 20 of the aircraft wing 16. The bottom surface 20 includes a recessed area 42. The recessed area 42 extends the length $L_3$. The split flap 36 is capable of being located in a retracted position within the confines of the recessed area 42, as shown in FIG. 3. The split flap 36 is also capable of being pivoted sixty degrees to assume the position shown in FIG. 2 which is an extended position. The retracted position for the split flap 36 is to be called the first retracted position. It is to be noted that the split flap 36 is to be controlled by an appropriate control (not shown) located within the aircraft, which is not shown, and is to be operated by the pilot. The function of the split flap 36 not only functions as an air brake when landing of the aircraft but also functions to increase lift. Not only is the lift desirable when landing of the aircraft 10 but also is desirable when taking off of the aircraft 10. The length of the runway that is required in order to take the aircraft 10 equipped with the auxiliary wing and flap assembly of the present invention would be in one-third to one-fourth the normal length that would be required by an aircraft that does not have the auxiliary wing and flap assembly of the present invention. Also, when landing of the aircraft, the landing distance will normally be one-third to one-fourth that of an aircraft that does not have mounted thereon the aircraft auxiliary wing and flap assembly of the present invention. It is to be noted that it has been found that it is best that the chord length of the split flap member 36 to be about 0.15 C.

The auxiliary wing assembly 44 is to include two separate airfoil-shaped members 46 and 48 which are basically identical. The airfoil-shaped member 46 has a length $L_1$, and airfoil-shaped member 48 has a length $L_2$. It is to be understood that a similar pair of the airfoil-shaped members will be mounted in conjunction with the wing 14 with only the inboard airfoil-shaped member 50 being shown in FIG. 1.

The outer edge 52 of the split flap member 36 is to be in alignment with the trailing edge 28 of the aircraft wing 16 when the split flap assembly 34 is in the first retracted position. The chord length of the airfoil-shaped member 46 is preferred to be 0.25 C. The same is true for the airfoil-shaped member 48. The airfoil-shaped member 46 is mounted on a pair of brackets 54 and 56. The brackets 54 and 56 are mounted on the bottom surface 20 of the left wing 16. The bracket 54 is mounted to a hinge joint 58 which is mounted within a track 60 formed within the bottom surface 20 of the aircraft wing 16. The bracket 56 is similarly mounted to a hinge joint 62 which is also mounted within a track 64 formed within the bottom surface 20 of the wing 16. The airfoil-shaped member 48 is similarly mounted onto two spaced apart brackets 66 and 68 with brackets 66 being mounted to a hinge joint 70 and bracket 68 mounted to a hinge joint 72. Hinge joint 70 is mounted within a track 74 and hinge joint 72 is mounted within a track 76.

It is to be understood that the hinge joints 58 and 62 move together simultaneously within their respective tracks 60 and 64. The same is true also for the hinge joints 70 and 72 relative to their respective tracks 74 and 76. Utilizing of the auxiliary wing and flap assembly for an aircraft of this invention, when landing the aircraft, permits the aircraft to land at a substantially steeper angle, generally up to thirty degrees, and then as the aircraft nears the runway and is pulled level by the pilot, the aircraft will quickly slow but at the same time lift so that the aircraft can settle very quietly and unforcibly right onto the runway. Generally when landing, the airfoil-shaped members 46 and 48 will be located at the forty-five degree position, which is shown in dotted lines in FIG. 2. The ninety degree position, which is the fully deployed position, shown in solid lines in FIG. 2 will only be used in an emergency situation. When taking off of the aircraft, the airfoil-shaped members 46 and 48 will also be in the dotted line position, as shown in FIG. 2. The split flap 36 will be in the sixty degree deployed position, as shown in FIG. 2, when the airfoil-shaped members 46 and 48 are in either the forty-five degree deployed position or the fully deployed ninety degree deployed position.

When the airfoil-shaped members 46 and 48 are in the stowed position, shown in FIG. 3, and the split flap assembly 34 is in the stowed position, as shown in FIG. 3, the auxiliary wing and flap assembly does not affect the cruising speed of the aircraft. It is to be noted that some present day aircraft are able to land and take off in relatively short distances. However, these aircraft can only achieve a relatively low cruising speed. The benefits from the structure of the present invention does not decrease the cruising speed of the aircraft and may even boost it. Another objective of the present invention is that when landing, utilizing of the auxiliary wing and flap apparatus of the present invention that the nose of the aircraft has a lower upper tilt. This improves visibility when landing and reduces the danger of a stall. Another objective of the present invention is to significantly diminish noise pollution around general aviation airports by allowing for steeper landing approaches and take-offs.

The pilot is to have the option of deploying either the auxiliary wing assembly 44 to either the forty-five degree position shown in dotted lines in FIG. 2 or the fully deployed ninety degree position, which is shown in solid lines in FIG. 2. This deployment is to cause movement of the airfoil-shaped member 46 out of the recessed area 78 formed within the bottom surface 20 of the wing 16 to assume either the forty-five degree position or the ninety degree position. Typically, these two positions will be what is required by the pilot. However, it is considered to be within the scope of this invention that other location angles of deployment could be utilized. When deployed to the forty-five degree position, the hinge joint 58 will move within the track 60 about one-half the distance of the track 60 in a direction toward the trailing edge 28. The same will be true for the hinge joint 62 relative to the track 64. When the airfoil-shaped member 46 is fully deployed, the maximum movement of the hinge joints 58 and 62 will occur to the aft end of their respective tracks 60 and 64 which will be the end of the tracks 60 and 64 which is located directly adjacent the recessed area 78. When the airfoil-shaped member 46 is in the stowed position, it is located in a close conforming manner within the recessed area 78. It is to be understood that by operating of a separate control mechanism the airfoil-shaped member 48 can be deployed in a manner similar to airfoil-shaped member 46 with the hinge joints 70 and 72 moving within their respective tracks 74 and 76.

It has been found for maximum lift effect and maximum braking effect that it is best to have the airfoil-shaped member 46 to be moved slightly toward the trailing edge 28. It is for this reason that the tracks 60 and 64 are provided. The same is true relative to the airfoil-shaped member 48. Between the airfoil-shaped member 46 and the bottom surface 20 is located an air gap 82. This air gap 82 is to have a width of 0.1 C. The air that rushes into contact with the airfoil-shaped member 46 when deployed will function as an air brake. The air that passes through the air gap 82 is cause to come into contact with the split flap assembly 34 which functions also as an air brake but also to increase lift. The air that is trapped between the auxiliary wing assembly 44 and the split flap assembly 34 was found to form into a vortex which substantially increases lift. Maximum lift is obtained with the width of this air gap to be, as previously defined, approximately 0.1 C.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An auxiliary wing and flap assembly for an aircraft comprising:

an aircraft wing having a leading edge and a trailing edge, said aircraft wing having a top surface and a bottom surface;

a split flap hingedly mounted on said bottom surface of said aircraft wing on a first hinge axis on said aircraft wing directly adjacent said trailing edge; said split flap to be movable between a first retracted position and an extended position, said first retracted position locates said split flap against said aircraft wing, said extended position locates said split flap substantially transverse to said aircraft wing extending from said bottom surface of said aircraft wing;

an auxiliary wing assembly mounted on said bottom surface of said aircraft wing by a hinge connected to said aircraft wing, said hinge connection located intermediate said leading edge and said first hinge axis, said auxiliary wing assembly defined as an airfoil-shaped member mounted by a bracket assembly to said aircraft wing, said auxiliary wing assembly being movable between a second retracted position and a deployed position, said second retracted position locates said auxiliary wing against said aircraft wing, said deployed position locates said auxiliary wing transversely to said aircraft wing extending from said bottom surface of said aircraft wing, when in said deployed position there being a longitudinal air gap area located between said auxiliary wing and said aircraft wing;

wherein said split flap is movable to be able to assume an angle of extension when in said extended position having an angular relationship of approximately sixty degrees relative to said bottom surface of said aircraft wing, said auxiliary wing when in said deployed position capable of assuming a substantially ninety degree position relative to said bottom surface of said aircraft wing; and wherein said aircraft wing has a chord length defined as C, said auxiliary wing having a chord length defined as approximately 0.25 C, the distance of said air gap area between said aircraft wing and said auxiliary wing being approximately 0.1 C, said flap having a chord length of approximately 0.15 C;

whereby said split flap and the auxiliary wing when located in the extended position and the deployed position respectively will cause the aircraft when flying to appreciably slow and lift in order to substantially shorten the landing distance when landing of the aircraft and also function to substantially increase lift for a very short takeoff.

2. The auxiliary wing and flap assembly for an aircraft as defined in claim 1 wherein:

said split flap being elongated and planar, the length of said split flap being less than the length of said aircraft wing.

3. The auxiliary wing and flap assembly for an aircraft as defined in claim 1 wherein:

said auxiliary wing assembly being divided into two sections of substantially equal length.

4. The auxiliary wing and flap assembly for an aircraft as defined in claim 1 wherein:

said hinge connection comprising a track, during movement of said auxiliary wing assembly from said second retracted position to said extended position said hinge connection is moved on said track towards said trailing edge a predetermined distance.

5. The auxiliary wing and flap assembly for an aircraft as defined in claim 1 wherein: said auxiliary wing assembly is divided into an inboard section and an outboard section.

* * * * *